United States Patent
Otani et al.

(10) Patent No.: US 6,483,624 B1
(45) Date of Patent: Nov. 19, 2002

(54) OPTICAL PULSE GENERATION SYSTEM FOR GENERATING OPTICAL PULSES HAVING HIGH DUTY RATIO

(75) Inventors: Akihito Otani, Atsugi (JP); Toshinobu Otsubo, Atsugi (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/455,562

(22) Filed: Dec. 6, 1999

(30) Foreign Application Priority Data

Dec. 24, 1998 (JP) .......................................... 10-366858

(51) Int. Cl.$^7$ .............................................. H04B 10/04
(52) U.S. Cl. ........................ 359/184; 359/180; 359/181
(58) Field of Search ................... 359/248, 125, 359/183, 264, 181, 158, 184, 187, 154; 375/238, 259, 295; 385/27

(56) References Cited

U.S. PATENT DOCUMENTS

| | | | |
|---|---|---|---|
| 5,184,243 A | * 2/1993 | Henmi et al. | 359/154 |
| 5,394,260 A | * 2/1995 | Suzuki et al. | 359/158 |
| 5,434,693 A | 7/1995 | Tanaka et al. | 359/180 |
| 5,726,789 A | * 3/1998 | Horiuchi et al. | 359/158 |
| 5,796,503 A | * 8/1998 | Junginger et al. | 359/125 |
| 5,798,856 A | * 8/1998 | Suzuki et al. | 359/181 |
| 5,974,209 A | * 10/1999 | Cho et al. | 385/27 |

FOREIGN PATENT DOCUMENTS

| | | | | |
|---|---|---|---|---|
| EP | 0 556 974 A | 8/1993 | | |
| EP | 741316 A1 | * 11/1996 | ............ | G02F/1/015 |
| JP | 5-283804 | 10/1993 | | |
| JP | 9-133901 | 5/1997 | | |

OTHER PUBLICATIONS

Related U.S. patent application Ser. No. 09/924,330, filed Aug. 8, 2001 Inventors: Akihito Otani and Toshinobu Otsubo Title: Pulse Generator.

(List continued on next page.)

*Primary Examiner*—Jason Chan
*Assistant Examiner*—David S. Kim
(74) *Attorney, Agent, or Firm*—Frishauf, Holtz, Goodman & Chick, P.C.

(57) ABSTRACT

An optical pulse generator includes a single-wavelength light source, an electroabsorption optical modulator, a sine-wave voltage generator, a nonlinear circuit, and a DC voltage source. The single-wavelength light source outputs continuous, single-wavelength light. The electroabsorption optical modulator receives the single-wavelength light, modulates the single-wavelength light according to a pulse modulation signal, and outputs the modulated light as optical pulses. The sine-wave voltage generator generates an electrical signal having a sine waveform. The nonlinear circuit extracts only a waveform equal to or higher than a predetermined DC voltage from the sine waveform electrical signal. The DC voltage source adds a negative DC voltage to the electrical signal, from which only the waveform equal to or higher than the predetermined DC voltage is extracted by the nonlinear circuit, and applies the sum signal to the electroabsorption optical modulator as the pulse modulation signal.

7 Claims, 9 Drawing Sheets

OTHER PUBLICATIONS

H. Tanaka et al: "Optical Short Pulse Generation by Double Gate Operation of Tandem Connected Electroabsorption Modulators Driven by Sinusoidal Voltages", Electronics Letters, GB IEEE Stevenage, vol. 29, No. 16, Aug. 5, 1993, pp. 1449–1451, XP000388437, ISSN: 0013–5194, p. 1450, left–hand column; Figures 1, 2.

Masatoshi Suzuki: "New Applications of a Sinusoidally Driven INGAASP Electroabsorption Modulator to In–Line Optical Gates with ASE Noise Reduction Effect", Journal of Lightwave Technology, U.S., IEEE, New York, vol. 10, No. 12, Dec. 1, 1992, pp. 1912–1918, XP000367892, ISSN: 0733–8724 p. 1913, right–hand column; p. 1914, left–hand column; p. 1915, right–hand column; p. 1917, left–hand column; Figures 1–3, 7 , 9, 12.

M. Suzuki et al: "10 GBIT/S Optical Demultiplexing and Switching By Sinusoidally Driven INGAASP Electroabsorption Modulators", Electronics Letters, GB, IEEE Stevenage, vol. 28, No. 10, May 7, 1992, ISSN: 0013–5194; entire document.

* cited by examiner

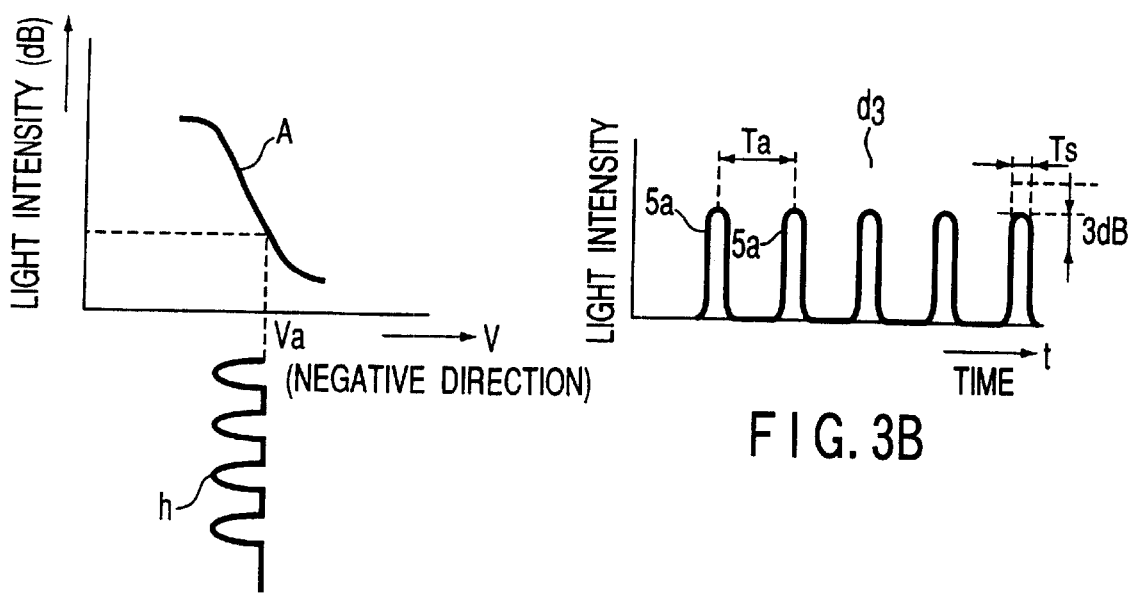
FIG. 3A
FIG. 3B
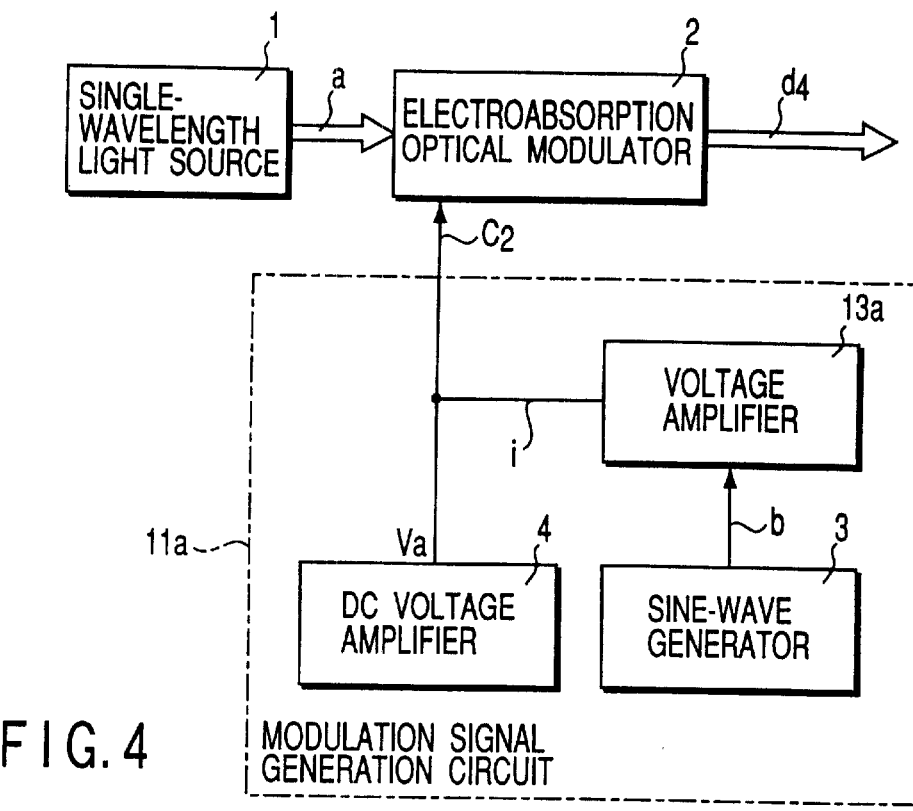
FIG. 4

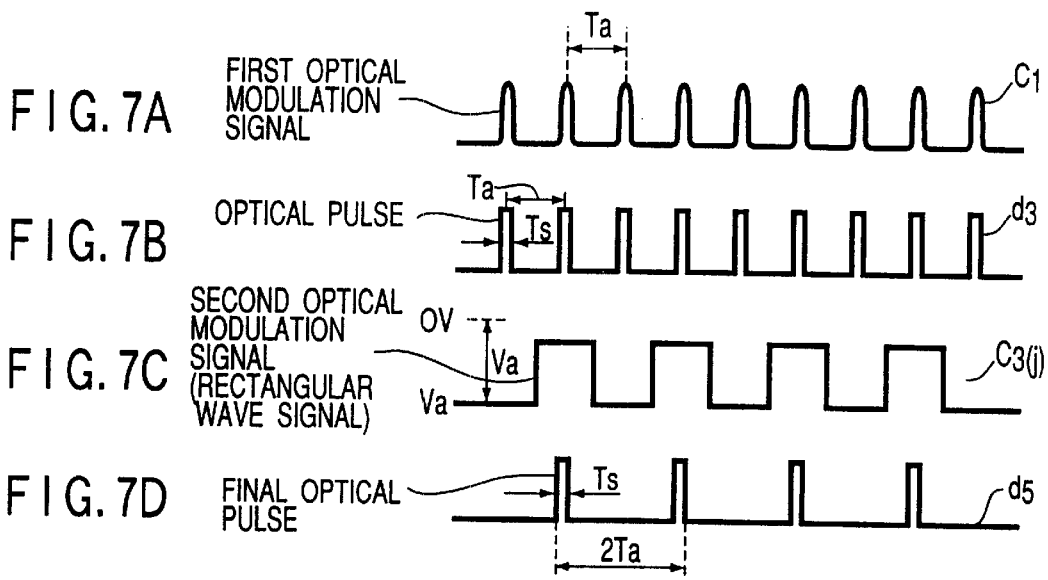
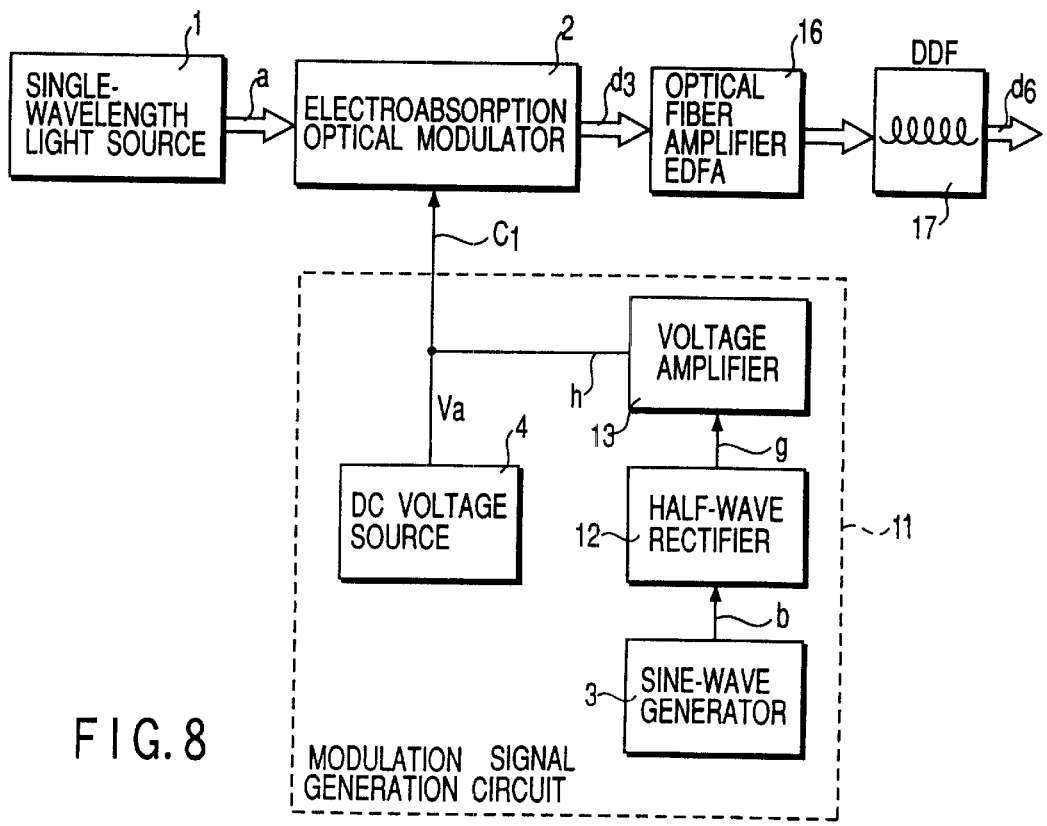

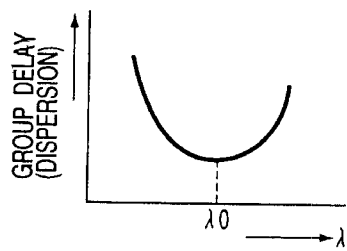
FIG. 9A
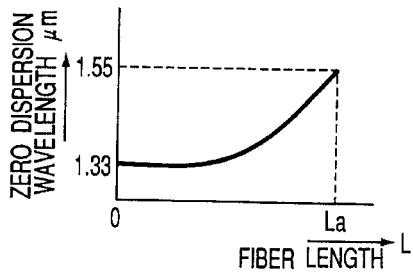
FIG. 9B
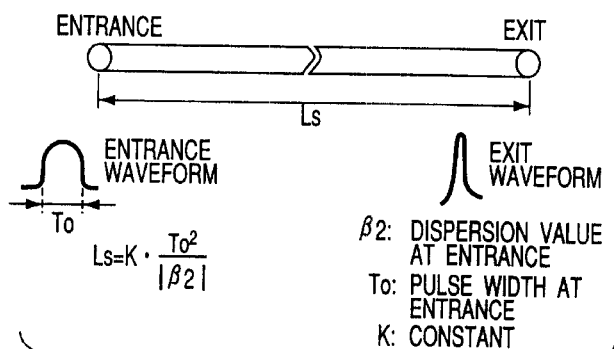
FIG. 10
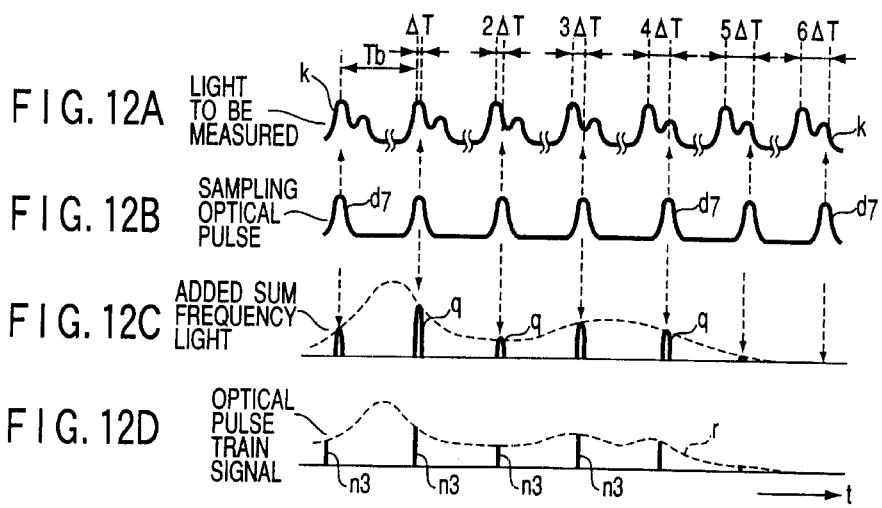
FIG. 12A LIGHT TO BE MEASURED
FIG. 12B SAMPLING OPTICAL PULSE
FIG. 12C ADDED SUM FREQUENCY LIGHT
FIG. 12D OPTICAL PULSE TRAIN SIGNAL

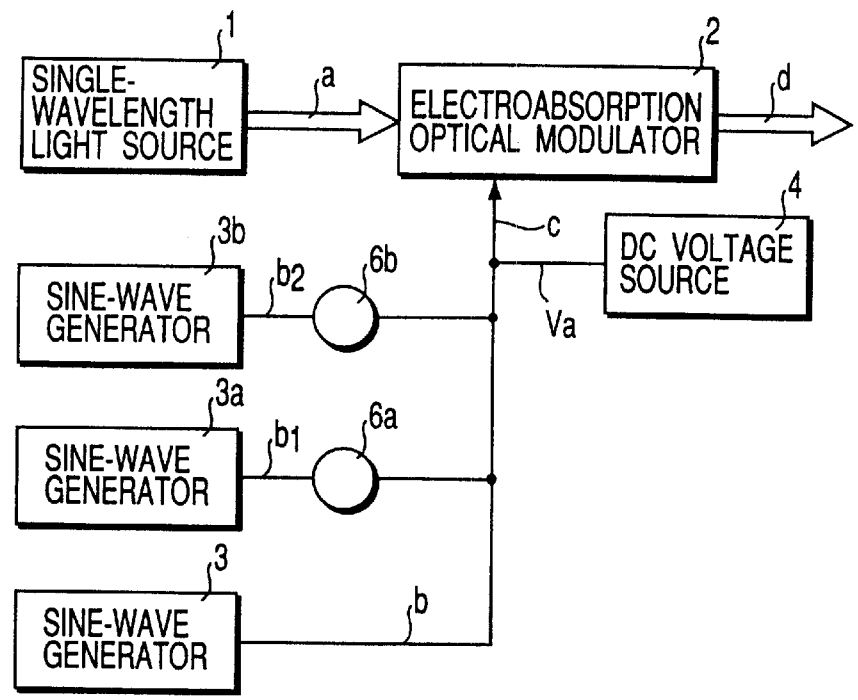
FIG. 17 PRIOR ART
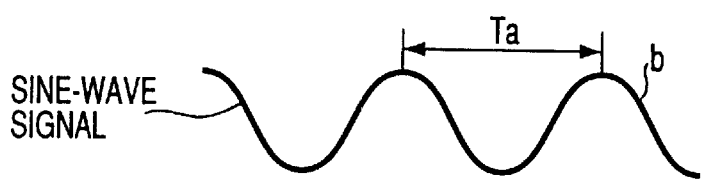
FIG. 18A PRIOR ART    SINE-WAVE SIGNAL
FIG. 18B PRIOR ART    SINE-WAVE SIGNAL
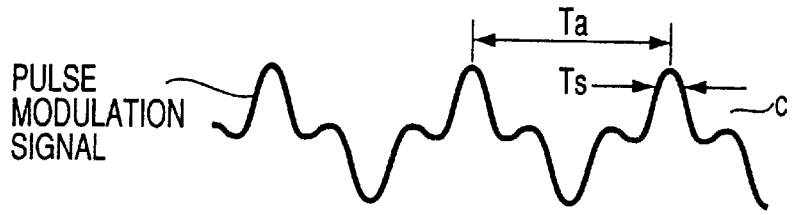
FIG. 18C PRIOR ART    PULSE MODULATION SIGNAL

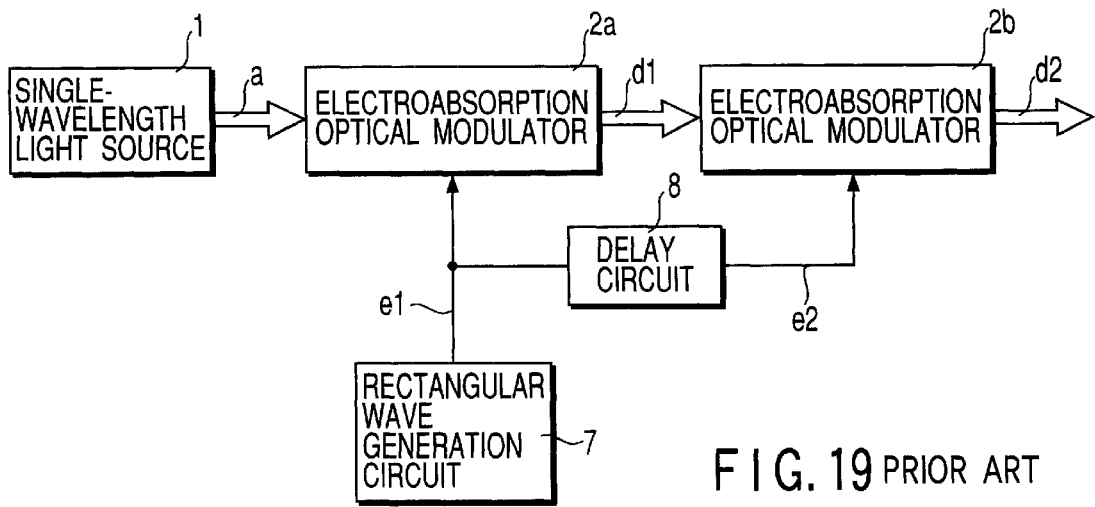
FIG. 19 PRIOR ART
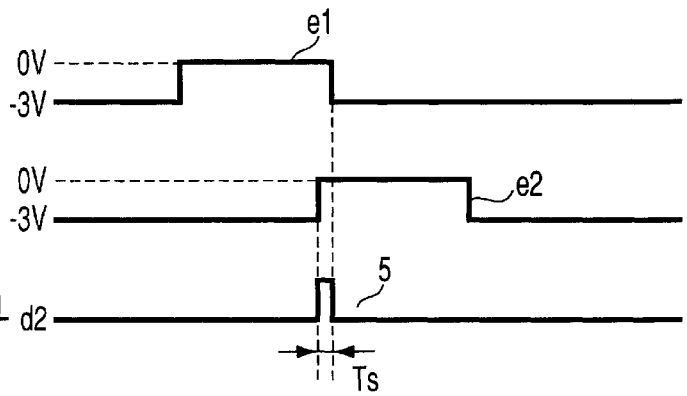
FIG. 20A PRIOR ART
FIG. 20B PRIOR ART
FIG. 20C PRIOR ART
FIG. 21 PRIOR ART

US 6,483,624 B1

OPTICAL PULSE GENERATION SYSTEM FOR GENERATING OPTICAL PULSES HAVING HIGH DUTY RATIO

BACKGROUND OF THE INVENTION

The present invention relates to an optical pulse generation system and, more particularly, to a method and device for outputting optical pulses having high duty ratio, and an optical sampling pulse generation apparatus using the device.

Conventionally, as a device for generating high-duty optical pulses which have a repetition frequency ranging from several GHz to 10 GHz used in an optical communication system and a small pulse width, an optical pulse generation device using an electroabsorption optical modulator has been proposed, as shown in FIG. 14 (Jpn. Pat. Appln. KOKAI Publication No. 5-283804).

In this optical pulse generation device, for example, light a, which is a laser beam output from a single-wavelength light source 1 such as a laser beam source or the like, and has a continuous, single wavelength, becomes incident on the light entrance surface of an electroabsorption optical modulator 2.

The modulator electrode of this electroabsorption optical modulator 2 receives a pulse modulation signal c, which is obtained by adding a negative DC voltage Va output from a DC voltage source 4 to a sine-wave signal b output from a sine-wave generator 3.

The electroabsorption optical modulator 2 outputs, from its light exit surface, optical pulses d obtained by modulating the light a, which becomes incident on its light entrance surface and has a continuous, single wavelength, by the pulse modulation signal c input to its modulator electrode.

The electroabsorption optical modulator 2 has light absorption characteristics A shown in FIG. 15 with respect to a negatively applied DC voltage V.

A DC voltage V is plotted in a linear scale on the abscissa of the light absorption characteristics A, while the light intensity to be output is plotted in a logarithmic (decibel: dB) scale along the ordinate.

Hence, when the sine-wave signal b is applied to the modulator electrode of this electroabsorption optical modulator 2 at a bias point that has shifted in the negative direction by the negative DC voltage Va, as shown in FIG. 16A, optical pulses d shown in FIG. 16B are output from the light exit surface of this electroabsorption optical modulator 2.

More specifically, as the optical pulses d, pulses 5 that define a waveform in which minus portions of the sine-wave signal b are compressed and its plus portions are amplified in a linear scale appear at periods Ta of the sine-wave signal b, as shown in FIG. 16B.

The pulse width Ts of each pulse 5 that forms the optical pulses d output from the light exit surface of the electroabsorption optical modulator 2, i.e., from the optical pulse generation device is expressed by the width of a portion 3 dB below the top of that pulse 5.

The pulse width Ts of the portion 3 dB below is greatly smaller than the period Ta of the sine-wave signal b.

Hence, using the pulse modulation signal c obtained by adding the negative DC voltage Va to the sine-wave signal b, the high-duty optical pulses d having the pulse width Ts greatly smaller than the repetition period Ta can be obtained.

In recent years, in an optical communication system, the transfer rate of optical signals is increasing, and an optical pulse generation device capable of generating optical pulses d having a pulse width Ts still smaller than the repetition period Ta is required.

Such requirement is also adamant in an optical sampling pulse generation device that outputs optical sampling pulses used to sample light to be measured, which becomes incident on a light sampling unit in a light sampling waveform measurement apparatus.

Hence, since the pulse width Ts of the optical pulses generated by the optical pulse generation device shown in FIG. 14 depends on the period Ta of the sine-wave signal b, i.e., a frequency $f_A$ of the sine-wave signal, a pulse width still smaller than the repetition period Ta cannot be obtained.

To combat this problem, an optical pulse generation device shown in FIG. 17 has been proposed (Jpn. Pat. Appln. KOKAI Publication No. 9-133901).

This optical pulse generation device shown in FIG. 17 comprises a plurality of sine-wave generators 3a and 3b for outputting sine-wave signals $b_1$ and $b_2$ (see FIG. 18B; only $b_1$ is illustrated) having different frequencies with respect to a sine-wave generator 3 for outputting a fundamental sine-wave signal b (see FIG. 18A having a frequency $f_A$.

The sine-Wave signals $b_1$ and $b_2$ are respectively delayed a predetermined amount by delay circuits 6a and 6b, and the delayed signals are added to the fundamental sine-wave signal b, thus obtaining a pulse modulation signal c having sharp peaks, as shown in FIG. 18C.

By applying the pulse modulation signal c having sharp peaks to the modulator electrode of an electroabsorption optical modulator 2, the pulse width Ts alone can be shortened without changing the repetition period Ta of optical pulses d output from the light exit surface of this electroabsorption optical modulator 2.

Furthermore, conventionally, an optical pulse generation device using a rectangular wave signal shown in FIG. 19 has been proposed (Jpn. Pat. Appln. KOKAI Publication No. 5-283804).

In the optical pulse generation device shown in FIG. 19, light a output from a single-wavelength light source 1 is modulated into optical pulses $d_1$ by a first electroabsorption optical modulator 2a, and is then modulated into optical pulses $d_2$ by a second electroabsorption optical modulator 2b.

A rectangular wave signal $e_1$ (FIG. 20A) output from a rectangular wave generator 7 is applied to the first electroabsorption optical modulator 2a.

On the other hand, a rectangular signal $e_2$ (FIG. 20B), which is obtained by delaying the rectangular wave signal $e_1$ output from the rectangular wave generator 7 a predetermined period of time by a delay circuit 8, is applied to the second electroabsorption optical modulator 2b.

As a result, optical pulses $d_2$ output from the second electroabsorption optical modulator 2b include pulses 5 having a pulse width Ts corresponding to the overlapping time between the rectangular wave signals $e_1$ and $e_2$, as shown in FIG. 20C.

Hence, when a short overlapping time between the rectangular wave signals $e_1$ and $e_2$ is set by adjusting the delay time of the delay circuit 8, as shown in FIGS. 20A, 20B, and 20C, only the pulse width TS can be shortened without changing the repetition period Ta of the output optic al pulses $d_2$.

However, the optical pulse generation devices shown in FIGS. 17 and 19 still suffer the following problems.

In the optical pulse generation device shown in FIG. 17, in order to obtain the pulse modulation signal c having sharp peaks shown in FIG. 18C, the delay amounts in delay circuits 6a and 6b must be set with high precision while synchronizing sine-wave generators 3, 3a, and 3b.

In this case, since the frequency of the sine-wave signal b is as very high as several GHz to 10 GHz, complicated setting adjustment is required to set the delay amounts with high precision, and the delay amount may vary soon even after they are set with high precision.

Furthermore, the optical pulse generation device shown in FIG. 17 requires a large number of sine-wave generators 3, 3a, and 3b, and delay circuits 6a and 6b, resulting in a complicated circuit arrangement.

In the optical pulse generation device shown in FIG. 19, since the repetition frequency of the rectangular wave signal $e_1$ output from the rectangular wave generator 7 is as very high as several GHz to 10 GHz, jitter of around 1 ps is produced at the leading and trailing edges of the rectangular wave.

As a consequence, jitter of around 1 ps is produced in the optical pulses $d_2$ output from this optical pulse generation device.

The jitter of around 1 ps is not negligible for optical pulses which are required to have a pulse width Ts of 3 to 4 ps.

Consequently, in this pulse generation device, decreasing the pulse width Ts of the output optical pulses $d_2$ by setting a short overlapping time between the rectangular wave signals $e_1$ and $e_2$ is limited.

BRIEF SUMMARY OF THE INVENTION

The present invention has been made in consideration of the above situation, and has as its object to provide a method and device for generating optical pulses, which can form a sharp peak waveform in a pulse modulation signal to be applied to an electroabsorption optical modulator by a simple circuit arrangement, and can still shorten only the pulse width compared to the repetition period of output optical pulses, and an optical sampling pulse generation apparatus using the device.

In order to achieve the above object, according to the present invention, (1) there is provided an optical pulse generation method in which a pulse modulation signal is applied to an electroabsorption optical modulator while continuous, single-wavelength light is launched into the electroabsorption optical modulator so as to modulate the incoming single-wavelength light by the pulse modulation signal and to output the modulated light as optical pulses, comprising the steps of:
generating an electrical signal having a sine waveform;
extracting only a waveform not less than a predetermined DC voltage from the sine waveform of the electrical signal; and
adding a negative DC voltage to the extracted waveform, and applying the sum signal to the electroabsorption optical modulator as the pulse modulation signal.

In order to achieve the above object, according to the present invention, (2) there is provided an optical pulse generation device comprising:
a single-wavelength light source for outputting continuous, single-wavelength light;
an electroabsorption optical modulator for receiving the single-wavelength light output from the single-wavelength light source, modulating the incoming single-wavelength light according to an externally applied pulse modulation signal, and outputting the modulated light as optical pulses;
a sine-wave voltage generator for generating an electrical signal having a sine waveform;
a nonlinear circuit for extracting only a waveform not less than a predetermined DC voltage from the sine waveform of the electrical signal generated by the sine-wave voltage generator; and
a DC voltage source for adding a negative DC voltage to the extracted waveform by the nonlinear circuit, and applying the sum signal to the electroabsorption optical modulator as the pulse modulation signal.

In order to achieve the above object, according to the present invention, (3) there is provided an optical pulse generation device according to (2), wherein the nonlinear circuit comprises:
a half-wave rectification circuit for outputting a half-wave rectified signal of the electrical signal having the sine waveform, which is output from the sine-wave voltage generator; and
a voltage amplifier for voltage-amplifying the half-wave rectified signal output from the half-wave rectification circuit.

In order to achieve the above object, according to the present invention, (4) there is provided an optical pulse generation device according to (2), wherein the nonlinear circuit comprises a voltage amplifier, an operation point of which can be shifted, and voltage-amplifies the electrical signal having the sine waveform output from the sine-wave voltage generator while the operation point is shifted in a negative direction.

In order to achieve the above object, according to the present invention, (5) there is provided an optical pulse generation device comprising:
a single-wavelength light source for outputting continuous, single-wavelength light;
a first electroabsorption optical modulator for receiving the single-wavelength light output from the single-wavelength light source, modulating the incoming single-wavelength light according to an externally applied pulse modulation signal, and outputting the modulated light as optical pulses;
a first modulation signal generation circuit comprising:
a) a sine-wave voltage generator for generating an electrical signal having a sine waveform,
b) a nonlinear circuit for extracting only a waveform not less than a predetermined DC voltage from the sine waveform of the electrical signal generated by the sine-wave voltage generator, and
c) a DC voltage source for adding a negative DC voltage to the extracted waveform by the nonlinear circuit, and applying the sum signal to the first electroabsorption optical modulator as the pulse modulation signal;
a second electroabsorption optical modulator for receiving the optical pulses output from the first electroabsorption optical modulator, modulating the incoming optical pulses according to an externally applied pulse modulation signal, and outputting the modulated optical pulses as final optical pulses; and
a second modulation signal generation circuit comprising:
a) a DC voltage source for outputting a negative DC voltage, b) a rectangular wave signal generation circuit for outputting a rectangular wave signal, and c) a sync adjustment circuit, the second modulation signal generation circuit synchronously adjusting the rectangular wave signal output from the rectangular wave signal generation circuit by the sync adjustment circuit to make individual rectangular waves of the rectangular wave signals include optical pulses once every predetermined number of pulses, adding the negative DC voltage output from the DC voltage source to the adjusted rectangular wave signal, and applying the sum signal to the second electroabsorption optical modulator as the pulse modulation signal.

In order to achieve the above object, according to the present invention, (6) there is provided an optical pulse generation device comprising:

a single-wavelength light source for outputting continuous, single-wavelength light;

an electroabsorption optical modulator for receiving the single-wavelength light output from the single-wavelength light source, modulating the incoming single-wavelength light according to an externally applied pulse modulation signal, and outputting the modulated light as optical pulses;

a modulation signal generation circuit comprising:

a) a sine-wave voltage generator for generating an electrical signal having a sine waveform, b) a nonlinear circuit for extracting only a waveform not less than a predetermined DC voltage from the sine waveform of the electrical signal generated by the sine-wave voltage generator, and c) a DC voltage source for adding a negative DC voltage to the extracted waveform by the nonlinear circuit, and applying the sum signal to the electroabsorption optical modulator as the pulse modulation signal; and a dispersion decreasing fiber for receiving the optical pulses output from the electroabsorption optical modulator at one end, and outputting the incoming optical pulses as final optical pulses from the other end.

In order to achieve the above object, according to the present invention, (7) there is provided an optical sampling pulse generation device for outputting optical sampling pulses used to sample light to be measured, which enters a light sampling unit in a light sampling waveform measurement apparatus, comprising:

a single-wavelength light source for outputting continuous, single-wavelength light;

a first electroabsorption optical modulator for receiving the single-wavelength light output from the single-wavelength light source, modulating the incoming single-wavelength light according to an externally applied pulse modulation signal, and outputting the modulated light as optical pulses;

a first modulation signal generation circuit comprising:

a) a nonlinear circuit for extracting only a waveform not less than a predetermined DC voltage from an electrical signal having a sine waveform, and b) a DC voltage source for adding a negative DC voltage to the extracted waveform by the nonlinear circuit, and applying the sum signal to the first electroabsorption optical modulator as the pulse modulation signal;

a second electroabsorption optical modulator for receiving the optical pulses output from the first electroabsorption optical modulator, modulating the incoming optical pulses according to an externally applied pulse modulation signal, and outputting the modulated optical pulses as final optical pulses; and a second modulation signal generation circuit comprising:

a) a DC voltage source for outputting a negative DC voltage, b) a rectangular wave signal generation circuit for outputting a rectangular wave signal, and c) a sync adjustment circuit, the second modulation signal generation circuit synchronously adjusting the rectangular wave signal output from the rectangular wave signal generation circuit by the sync adjustment circuit to make individual rectangular waves of the rectangular wave signals include optical pulses once every predetermined number of pulses, adding the negative DC voltage output from the DC voltage source to the adjusted rectangular wave signal, and applying the sum signal to the second electroabsorption optical modulator as the pulse modulation signal;

a dispersion decreasing fiber for receiving the optical pulses output from the second electroabsorption optical modulator at one end, and outputting the incoming optical pulses as final optical pulses from the other end;

a timing clock generation circuit for supplying a first sampling clock signal which is delayed a predetermined time from a clock signal based on a repetition period of the light to be measured to the nonlinear circuit of the first modulation signal generation circuit as the electrical signal having the sine waveform; and a frequency divider for supplying a second sampling clock signal which is obtained by frequency-dividing the first sampling clock signal from the timing clock generation circuit at a predetermined ratio to the sync adjustment circuit of the second modulation signal generation circuit.

Invention above is applied to an optical pulse generation method in which a pulse modulation signal is applied to an electroabsorption optical modulator while continuous, single-wavelength light becomes incident on the electroabsorption optical modulator to modulate the incoming single-wavelength light by the pulse modulation signal, thus outputting the modulated light as optical pulses.

In order to achieve the above object, in invention (1), an electrical signal having a sine waveform is generated, only a waveform equal to or higher than a predetermined DC voltage is extracted from the sine waveform of the electrical signal, a negative DC voltage is added to the extracted waveform, and the sum signal is then applied to the electroabsorption optical modulator as the pulse modulation signal.

The optical pulse generation device according to invention (2) above comprises a single-wavelength light source for outputting continuous, single-wavelength light, an electroabsorption optical modulator for receiving the single-wavelength light output from the single-wavelength light source, modulating the incoming single-wavelength light on the basis of an externally applied pulse modulation signal, and outputting the modulated light as optical pulses, a sine-wave voltage generator for generating an electrical signal having a sine waveform, a nonlinear circuit for extracting only a waveform not less than a predetermined DC voltage from the sine waveform of the electrical signal generated by the sine-wave voltage generator, and a DC voltage source for adding a negative DC voltage to the extracted waveform by the nonlinear circuit, and applying the sum signal to the electroabsorption optical modulator as the pulse modulation signal.

In the optical pulse generation device with this arrangement, the electrical signal output from the sine-wave voltage generator is rectified and amplified by extracting only the waveform equal to or higher than the predetermined DC voltage from its sine waveform.

That is, the electrical signal is sliced at an arbitrary signal level including the waveform center of half-wave rectification in a sine-wave signal waveform, and the sliced waveform portion is amplified.

Hence, substantially the same effect as in the optical pulse generation method of invention (1) can be obtained.

In the optical pulse generation method and device with the above arrangement, the pulse modulation signal applied to the electroabsorption optical modulator is the sum signal obtained by extracting only the waveform equal to or higher than the predetermined DC voltage from the sine waveform of the electrical signal, and adding the negative DC voltage to the extracted waveform In the optical pulse generation device according to invention (3) above, in invention (2), the nonlinear circuit comprises a half-wave rectification circuit for outputting a half-wave rectified signal of the electrical signal having the sine waveform, which is output from the sine-wave voltage generator, and a voltage amplifier for voltage-amplifying the half-wave rectified signal output from the half-wave rectification circuit.

In the optical pulse generation device with this arrangement, the pulse modulation signal applied to the electroabsorption optical modulator is the sum signal obtained by amplifying the half-wave rectified signal by the amplifier, and adding the negative DC voltage to the amplified half-wave rectified signal.

In this case, the voltage value of the pulse modulation signal applied to the electroabsorption optical modulator inevitably has an upper limit value.

Since the bias point in light absorption characteristics A shown in FIG. 15 is also limited, the amplitude value (P—P) of the amplified half-wave rectified signal to be added to the negative DC voltage VA is limited.

The waveforms of the respective signals when the amplitude value (P—P) of the half-wave rectified signal is equal to that of the sine-wave signal before half-wave rectification are compared.

Of these signals, the half-wave rectified signal waveform is obtained by extracting only positive portions of the sine-wave signal waveform.

Hence, when the amplitude values (P—P) are equal to each other, the half-wave rectified signal waveform is elongated in the vertical direction compared to the sine-wave signal waveform.

As a result, the half-wave rectified signal waveform defines a sharp peak waveform that has larger changes in voltage per unit time than the sine-wave signal waveform.

Hence, the pulse width Ts of modulated optical pulses output from the electroabsorption optical modulator can be greatly smaller than that of conventional optical pulses modulated using the sine-wave signal.

Note that the repetition period Ta of optical pulses is determined by the frequency $f_A$ of the sine-wave signal before half-wave rectification, and is not shortened.

Therefore, only the pulse width Ts can be further shortened compared to the repetition period Ta of optical pulses output from the electroabsorption optical modulator.

In the optical pulse generation device with this arrangement, an electrical signal output from the sine-wave voltage generator is rectified and amplified by extracting only a waveform equal to or higher than a predetermined DC voltage from the sine waveform of that electrical signal.

That is, the electrical signal is sliced at an arbitrary signal level including the waveform center of half-wave rectification of claim 2 in a sine-wave signal waveform, and the sliced waveform portion is amplified. Hence, substantially the same effect as in the optical pulse generation method of invention can be obtained.

In the optical pulse generation device according to invention (4) above, in invention (2), the nonlinear circuit comprises a voltage amplifier, an operation point of which can be shifted, and voltage-amplifies the electrical signal having the sine waveform output from the sine-wave voltage generator while the operation point is shifted in a negative direction.

That is, this optical pulse generation device comprises a single-wavelength light source for outputting continuous, single-wavelength light, an electroabsorption optical modulator for receiving the single-wavelength light output from the single-wavelength light source, modulating the incoming single-wavelength light on the basis of an externally applied pulse modulation signal, and outputting the modulated light as an optical pulse, and a modulation signal generation circuit which comprises a DC voltage source for outputting a negative DC voltage, a sine-wave generation circuit for outputting a sine-wave signal, and a voltage amplifier whose operation point can be shifted, amplifies the sine-wave signal by the voltage amplifier while the operation point is shifted in the negative direction, adds the negative DC voltage to the amplified sine-wave signal, and applies the sum signal to the electroabsorption optical modulator as the pulse modulation signal.

The voltage amplifier whose operation point can be shifted is assembled in the optical pulse generation device with this arrangement. The sine-wave signal is amplified by that voltage amplifier while the operation point is shifted in the negative direction.

Hence, the amplified sine-wave signal has a waveform obtained by cutting off some minus components.

As a result, the amplified sine-wave signal is approximated to the amplified half-wave rectified signal.

At this time, when the amplitude value (P—P) of the amplified signal is constant, since the amplified sine-wave signal has a sharp peak waveform having a larger change in voltage per unit time, as described above, nearly the same effect as in the above inventions can be obtained.

An optical pulse generation device according to invention (5) comprises a single-wavelength light source for outputting continuous, single-wavelength light, a first electroabsorption optical modulator for receiving the single-wavelength light output from the single-wavelength light source, modulating the incoming single-wavelength light on the basis of an externally applied pulse modulation signal, and outputting the modulated light as an optical pulse, a first modulation signal generation circuit which substantially comprises a DC voltage source for outputting a negative DC voltage, a half-wave rectification circuit for outputting a half-wave rectified signal, and a voltage amplifier, amplifies the half-wave rectified signal by the voltage amplifier, adds the negative DC voltage to the amplified half-wave rectified signal, and applies the sum signal to the first electroabsorption optical modulator as the pulse modulation signal, a second electroabsorption optical modulator for receiving optical pulses output from the first electroabsorption optical modulator, modulating the incoming optical pulses on the basis of an externally applied pulse modulation signal, and outputting the modulated optical pulses as final optical pulses, and a second modulation signal generation circuit which comprises a DC voltage source for outputting a negative DC voltage, a rectangular wave signal generation circuit for outputting a rectangular wave signal, and a sync adjustment circuit, synchronously adjusts the rectangular wave signal output from the rectangular wave signal generation circuit using the sync adjustment circuit so that individual rectangular waves of the rectangular wave signal include optical pulses once every predetermined number of pulses, adds the negative DC voltage to the adjusted rectangular wave signal, and applies the sum signal to the second electroabsorption optical modulator as the pulse modulation signal.

In the optical pulse generation device with this arrangement, light output from the single-wavelength light source is modulated by the first electroabsorption optical modulator to obtain optical pulses, and these optical pulses are further modulated by the second electroabsorption optical modulator to obtain final optical pulses.

Since the first modulation signal generation circuit having the same arrangement as that of the modulation signal generation circuit of claim 2 is connected to the first electroabsorption optical modulator, optical pulses output from the first electroabsorption optical modulator have a small pulse width Ts.

Since the pulse modulation signal of the rectangular wave signal, that includes optical pulses once every predetermined number of pulses is applied to the second electroabsorption optical modulator, the optical pulses output from the first electroabsorption optical modulator are output once every predetermined number of pulses by decimation.

As a consequence, the repetition period Ta of pulses is prolonged. However, since the pulse width Ts of each pulse of the optical pulses remains the same, the pulse width Ts can be still shortened compared to the pulse repetition period Ta.

An optical pulse generation device according to invention (6) comprises a single-wavelength light source for outputting continuous, single-wavelength light, an electroabsorption optical modulator for receiving the single-wavelength light output from the single-wavelength light source, modulating the incoming single-wavelength light on the basis of an externally applied pulse modulation signal, and outputting the modulated light as an optical pulse, a modulation signal generation circuit which substantially comprises a DC voltage source for outputting a negative DC voltage, a half-wave rectification circuit for outputting a half-wave rectified signal, and a voltage amplifier, amplifies the half-wave rectified signal by the voltage amplifier, adds the negative DC voltage to the amplified half-wave rectified signal, and applies the sum signal to the electroabsorption optical modulator as the pulse modulation signal, and a dispersion decreasing fiber for receiving optical pulses output from the electroabsorption optical modulator at one end, and outputting the incoming optical pulses as final optical pulses from the other end.

In the optical pulse generation device with this arrangement, the dispersion decreasing fiber is further connected to the optical pulse generation device according to invention (2) above.

The dispersion decreasing fiber has characteristics in which the wavelength dispersion of light input from one end decreases with increasing distance if a predetermined wavelength condition and an optical fiber length condition (soliton condition) are satisfied, as is well known.

As a result, the pulse width Ts of optical pulses output from the other end is further shortened.

An optical sampling pulse generation apparatus according to invention (7) has the arrangements of the optical pulse generation devices according to inventions (5), (6) and their features, and also has an arrangement unique to an optical sampling pulse generation apparatus serving as a light sampling waveform measurement apparatus and their features.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are respectively a graph for explaining modulation of an electroabsorption optical modulator in the optical pulse generator according to the first embodiment, and a waveform chart of output optical pulses;

FIG. 4 is a schematic block diagram showing the arrangement of an optical pulse generation device according to the second embodiment of the present invention;

FIGS. 7A to 7D are waveform charts of the respective signals for explaining the operation of the pulse generation device according to the third embodiment;

FIG. 8 is a schematic block diagram showing the arrangement of an optical pulse generation device according to the fourth embodiment of the present invention;

FIGS. 9A and 9B are graphs showing the wavelength dispersion characteristics of a dispersion decreasing fiber used in the optical pulse generation device according to the fourth embodiment;

FIG. 10 is a view for explaining the wavelength dispersion characteristics of the dispersion decreasing fiber used in the optical pulse generation device according to the fourth embodiment;

FIGS. 12A to 12D are signal waveform charts of the respective units for explaining the operation principle of the light sampling waveform measurement apparatus shown in FIG. 11;

FIG. 17 is a schematic block diagram showing the arrangement of another conventional optical pulse generation device;

FIGS. 18A, 18B, and 18C are waveform charts of a sine-wave signal and modulated signal in the conventional optical pulse generation device shown in FIG. 17;

FIG. 19 is a schematic block diagram showing the arrangement of still another conventional optical pulse generation device;

FIGS. 20A, 20B, and 20C are waveform charts of a modulated signal and output optical pulses in the conventional optical pulse generation device shown in FIG. 19; and FIG. 21 is a waveform chart for explaining jitter produced in the modulated signal in the conventional optical pulse generation device shown in FIG. 19.

DETAILED DESCRIPTION OF THE INVENTION

Figure 1:
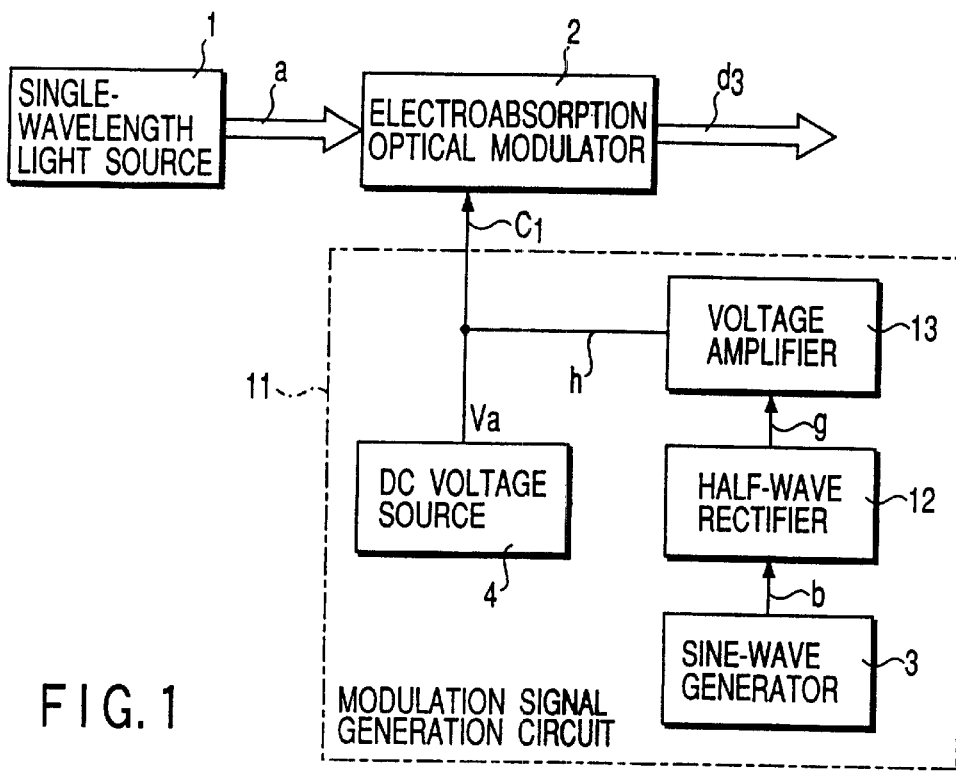
FIG. 1 is a schematic block diagram showing the arrangement of an optical pulse generation device according to the first embodiment to which an optical pulse generation method of the present invention is applied.

Reference will now be made in detail to the presently preferred embodiments of the invention as illustrated in the accompanying drawings, in which like reference numerals designate like or corresponding parts.

The preferred embodiments of the present invention will now be described with reference to the accompanying drawings.

First Embodiment

FIG. 1 is a schematic block diagram showing the arrangement of an optical pulse generation device to which an optical pulse generation method according to the first embodiment of the present invention is applied.

Figure 14:
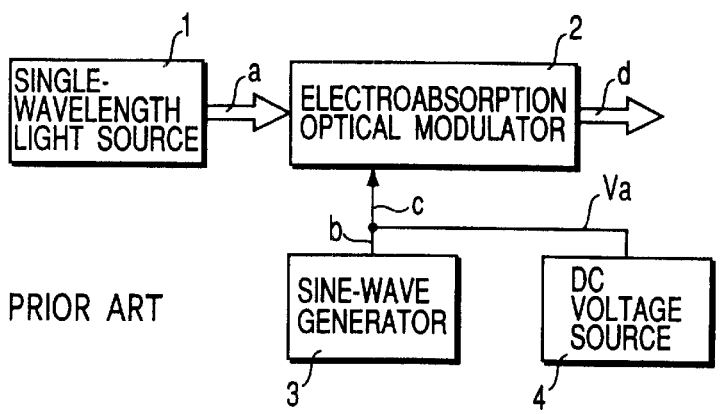
FIG. 14 is a schematic block diagram showing the arrangement of a conventional optical pulse generation device.
Figure 15:
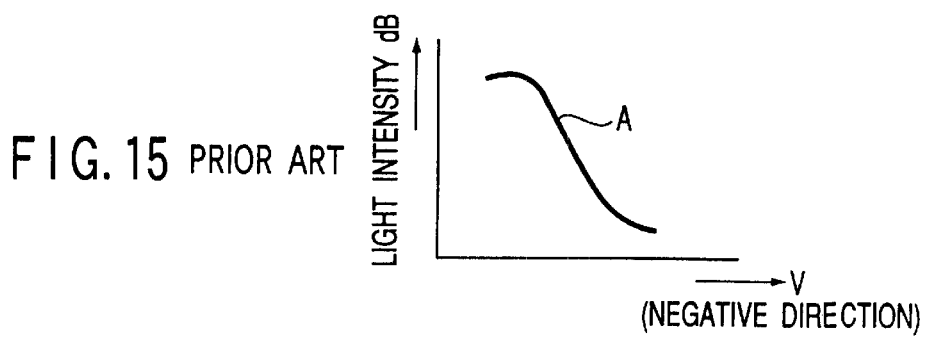
FIG. 15 is a graph showing the light absorption characteristics of an electroabsorption optical modulator.
Figure 16A:
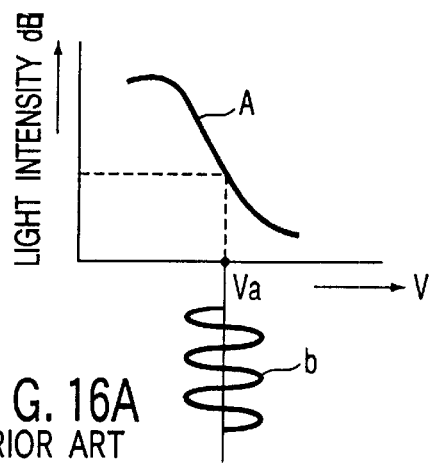
FIGS. 16A and 16B are respectively a graph showing modulation of the electroabsorption optical modulator in the conventional optical pulse generation device shown in FIG. 14, and a waveform chart of output optical pulses.
Figure 16B:
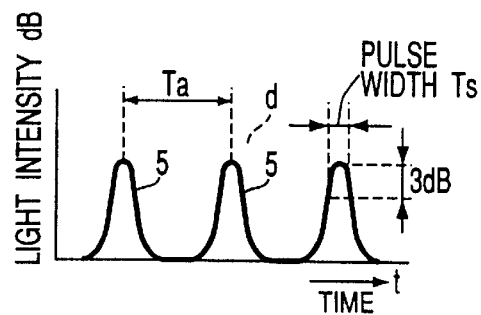

The same reference numerals in FIG. 1 denote the same parts as those in the conventional optical pulse generation device shown in FIG. 14, and a detailed description thereof will be omitted.

More specifically, as shown in FIG. 1, light a, which is a laser beam output from a single-wavelength light source i such as a laser beam source or the like, and has a continuous, single wavelength, is launched into the light entrance surface of an electroabsorption optical modulator 2.

Figure 2A:
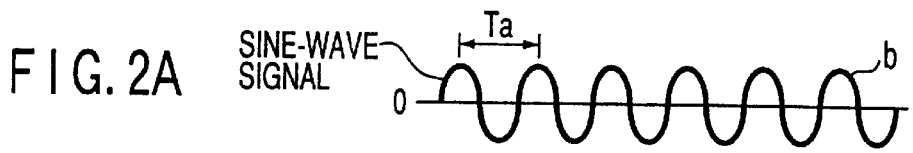
FIGS. 2A to 2D are signal waveform charts of the respective units for explaining the operation of a modulation signal generation circuit of the optical pulse generation device according to the first embodiment.
Figure 2B:
Figure 2C:
Figure 2D:
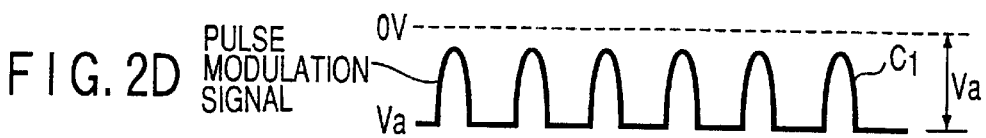

The modulator electrode of this electroabsorption optical modulator 2 receives a pulse modulation signal $c_1$, which has a waveform shown in FIG. 2D, from a modulation signal generation circuit 11.

The electroabsorption optical modulator 2 modulates the light a, which has entered the light entrance surface and has a continuous, single wavelength, by the pulse modulation signal $c_1$ input to the modulator electrode, and outputs optical pulses $d_3$ having a waveform shown in FIG. 3B from the light exit surface.

The modulation signal generation circuit 11 comprises a sine-wave generator 3, half-wave rectifier 12, voltage amplifier 13, and DC voltage source 4, as shown in FIG. 1.

The sine-wave generator 3 outputs a sine-wave signal b having a frequency $f_A$ (several GHz to 10 GHz) (period Ta) shown in, e.g., FIG. 2A, and sends it to the half-wave rectifier 12.

The half-wave rectifier 12 half-wave rectifies the sine-wave signal b, and outputs it to the next voltage amplifier 13 as a half-wave rectified signal g having a waveform shown in FIG. 2B.

The voltage amplifier 13 amplifies the half-wave rectified signal g, and outputs an amplified half-wave rectified signal h shown in FIG. 2C.

The DC voltage source 4 outputs a negative DC voltage Va.

The negative DC voltage Va is added to the amplified half-wave rectified signal h, and the sum signal is applied to the modulator electrode of the electroabsorption optical modulator 2 as the pulse modulation signal $c_1$.

In the optical pulse generation device with this arrangement, as described above, the amplified half-wave rectified signal h has a sharp peak waveform that has larger changes in voltage per unit time at peak portions of the electrical waveform than the signal obtained by amplifying the sine-wave signal b.

As shown in FIG. 3A, the amplified half-wave rectified signal h is included on the (+) side of a bias point indicated by the negative DC voltage Va, which is set with respect to modulation characteristics A of the electroabsorption optical modulator 2.

Hence, the electroabsorption optical modulator 2 outputs modulated optical pulses $d_3$ that repeat waves 5a each having a sharp peak at a period Ta, as shown in FIG. 3B.

A pulse width Ts in this case corresponds to the sharp peak waveform of the amplified half-wave rectified signal h.

Therefore, the duty ratio of the optical pulses $d_3$ output from the electroabsorption optical modulator 2 can be higher than those obtained by the conventional optical pulse generation device (FIG. 14) which directly uses the sine-wave signal b before half-wave rectification as a pulse modulation signal.

That is, the pulse width Ts can be further shortened with respect to the repetition period Ta.

Furthermore, the device of this embodiment is realized by adding a simple circuit arrangement, i.e., the half-wave rectifier 12 and voltage amplifier 13, to the conventional optical pulse generation device shown in FIG. 14, and the arrangement of the overall device can be greatly simplified compared to the conventional optical pulse generation device shown in FIG. 17.

Second Embodiment

FIG. 4 is a schematic block diagram showing the arrangement of an optical pulse generation device according to the second embodiment of the present invention.

The same reference numerals in FIG. 4 denote the same parts as those in the optical pulse generation device of the first embodiment shown in FIG. 1, and a detailed description thereof will be omitted.

More specifically, as shown in FIG. 4, light a output from a single-wavelength light source 1 is launched into an electroabsorption optical modulator 2, is modulated by a pulse modulation signal $c_2$ applied by a modulation signal generation circuit 11a, and is output as optical pulses $d_4$.

The modulation signal generation circuit 11a of the second embodiment comprises a sine-wave generator 3, a voltage amplifier 13a whose operation point can be shifted, and a DC voltage source 4, as shown in FIG. 4.

A sine-wave signal b having a frequency $f_A$ (period Ta) output from the sine-wave generator 3 is supplied to the voltage amplifier 13a.

Figures 5A, 5B:
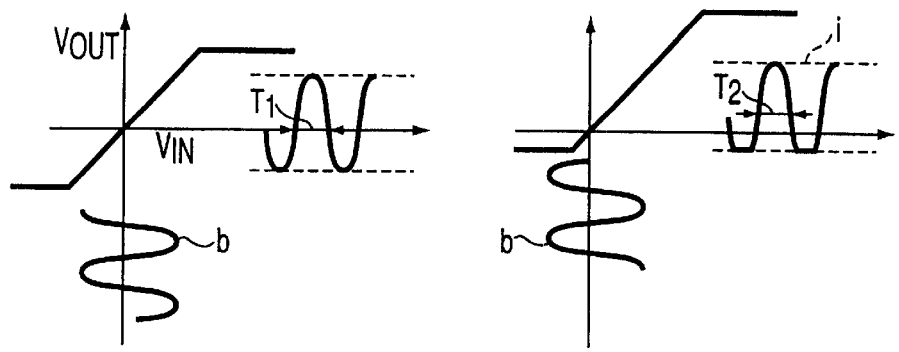
FIGS. 5A and 5B are graphs for explaining amplification of a voltage amplifier whose operation point can be shifted, in the optical pulse generation device according to the second embodiment.

The voltage amplifier 13a whose operation point can be shifted can arbitrarily set an operation point (bias point) with respect to the input sine-wave signal b upon amplifying the input sine-wave signal b, as shown in FIGS. 5A and 5B.

In FIG. 5A, the operation point (bias point) is set at zero-volt position of the input sine-wave signal b.

In this case, the amplified sine-wave signal has a normal sine waveform with symmetrical minus and plus components. Therefore, the half-width $T_1$ of the amplified sine-wave signal is equal to the half-width of the input sine-wave signal b.

However, in the device of the second embodiment, the operation point of the sine-wave signal b is set to shift in the negative direction, as shown in FIG. 5B.

Therefore, a sine-wave signal i amplified by this voltage amplifier 13a has a waveform obtained by cutting off some minus components.

Accordingly, the signal waveform of the amplified sine-wave signal i is approximate to that of the amplified half-wave rectified signal h shown in FIG. 2C in the device of the first embodiment. That is, the half-width $T_2$ of the amplified sine-wave signal i is narrower than the half-width of the input sine-wave signal b.

When the amplitude value (P—P) of this amplified signal is constant, the amplified sine-wave signal i has a sharper peak waveform, as described above.

A negative DC voltage Va is added to the amplified sine-wave signal i having a sharp peak waveform, and the sum signal is applied to the electroabsorption optical modulator 2 as the pulse modulation signal $c_2$.

Hence, the pulse width Ts of the optical pulses $d_4$ output from the electroabsorption optical modulator 2 can be greatly shortened as in the device of the first embodiment shown in FIG. 1.

Third Embodiment

Figure 6:
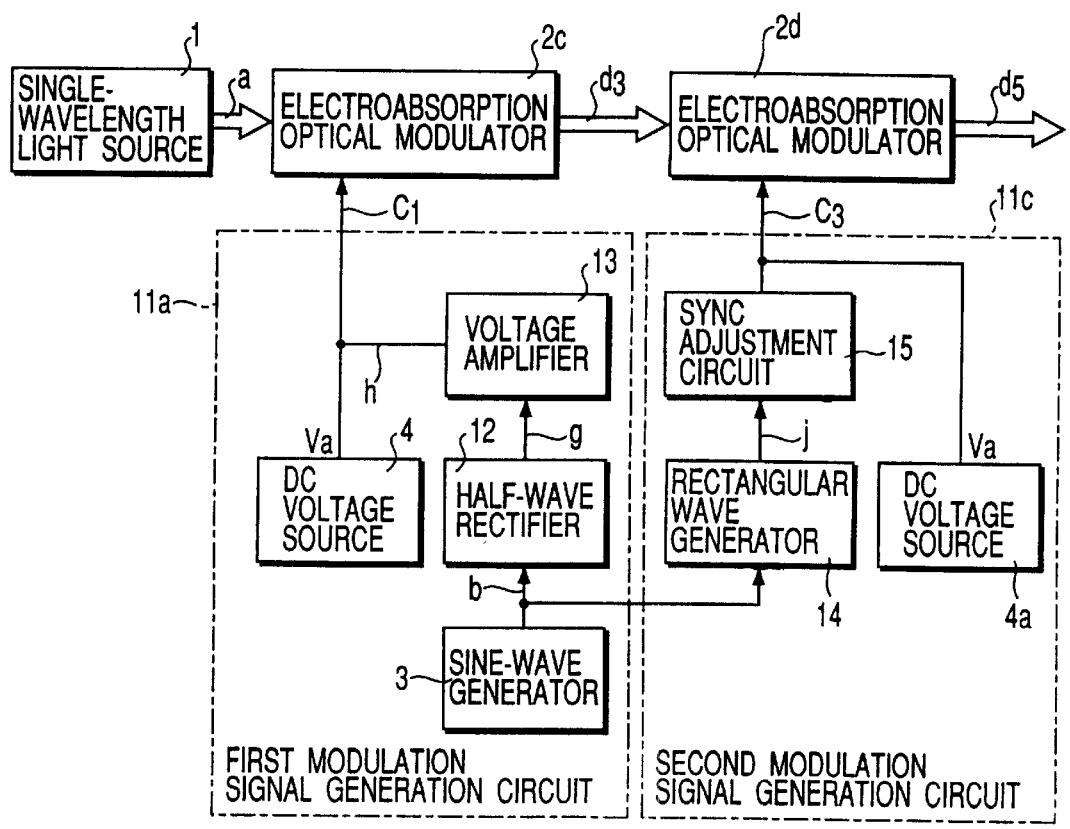
FIG. 6 is a schematic block diagram showing the arrangement of an optical pulse generation device according to the third embodiment of the present invention.

FIG. 6 is a schematic block diagram showing the arrangement of an optical pulse generation device according to the third embodiment of the present invention.

The same reference numerals in FIG. 6 denote the same parts as those in the optical pulse generation device of the first embodiment shown in FIG. 1, and a detailed description thereof will be omitted.

In the optical pulse generation device of this embodiment, two electroabsorption optical modulators 2c and 2d having the same arrangement are assembled.

More specifically, light a output from a single-wavelength light source 1 is modulated by the first electroabsorption optical modulator 2c to obtain optical pulses $d_3$, and the optical pulses $d_3$ are further modulated by the second electroabsorption optical modulator 2d to obtain final optical pulses $d_5$.

Since a first modulation signal generation circuit 11a having the same arrangement as the modulation signal generation circuit 11 in the device of the first embodiment is connected to the first electroabsorption optical modulator 2c, a first pulse modulation signal $c_1$ having a sharp peak waveform shown in FIG. 7A is applied to the first electroabsorption optical modulator 2c.

Hence, the optical pulses $d_3$ output from the first electroabsorption optical modulator 2c have a period Ta and small pulse width Ts, as shown in FIG. 7B.

A second pulse modulation signal $c_3$ shown in FIG. 7C is applied from a second modulation signal generation circuit 11c to the second electroabsorption optical modulator 2d.

As shown in FIG. 6, the second modulation signal generation circuit 11c comprises a rectangular wave generator 14, sync adjustment circuit 15, and DC voltage source 4a for outputting a negative DC voltage Va.

The rectangular wave generator 14 outputs a rectangular wave signal j which has a width roughly the same as the period Ta of the sine-wave signal b in the first modulation signal generation circuit 11a, and repeats itself at the same frequency $f_A$.

The sync adjustment circuit 15 adjusts the output timing of the rectangular wave signal j from the rectangular wave generator 14 and outputs a rectangular wave signal having a period of $2T_A$ so that the respective rectangular waves include every other optical pulses $d_3$ output from the first electroabsorption optical modulator 2c, as shown in FIG. 7C.

The negative DC voltage Va output from the DC voltage source 4a is added to the rectangular wave signal having the period of $2T_A$ that has undergone the output timing adjustment, and the sum signal is applied to the second electroabsorption optical modulator 2d as the second pulse modulation signal $c_3$.

Upon application of the second pulse modulation signal $c_3$ having the rectangular waveform, the second electroabsorption optical modulator 2d outputs only pulses, which are included in the rectangular waveform of the second pulse modulation signal $c_3$, of those which form the optical pulses $d_3$ input from the first electroabsorption optical modulator 2c.

Hence, the final optical pulses $d_5$ output from the second electroabsorption optical modulator 2d are optical pulses obtained by decimating every other pulses of the input optical pulses $d_3$, as shown in FIG. 7D.

In the device of this embodiment, every other optical pulses are decimated. However, every n-th optical pulses (n is an arbitrary integer) may be output by decimation.

As a result, the pulse repetition period of the optical pulses $d_5$ is extended to twice (2Ta) the repetition period Ta of the optical pulses $d_3$ output from the first electroabsorption optical modulator 2c.

However, since the pulse width Ts of each pulse of the optical pulses $d_5$ remains the same, the pulse width Ts can be further shortened compared to the repetition period 2Ta of pulses.

That is, a higher duty ratio can be realized.

Fourth Embodiment

FIG. 8 is a schematic block diagram showing the arrangement of a pulse generation device according to the fourth embodiment of the present invention.

The same reference numerals in FIG. 8 denote the same parts as those in the optical pulse generation device of the first embodiment shown in FIG. 1, and a detailed description thereof will be omitted.

In the optical pulse generation device of this embodiment, a series circuit of an optical fiber amplifier (EDFA: Erbium Doped Fiber Amplifier) 16 and dispersion decreasing fiber (DDF) 17 is connected to the output terminal for optical pulses of the optical pulse generation device of the first embodiment shown in FIG. 1.

More specifically, as shown in FIG. 8, light an output from a single-wavelength light source 1 is modulated by an electroabsorption optical modulator 2 to obtain optical pulses $d_3$, and the optical pulses $d_3$ are optically amplified to a predetermined light intensity level by the optical fiber amplifier (EDFA) 16. After that, the pulse width Ts of the optical pulses $d_3$ is further compressed by the dispersion decreasing fiber (DDF) 17, and the optical pulses $d_3$ are then output as final optical pulses $d_6$.

Since a modulation signal generation circuit 11 having the same arrangement as that in the device of the first embodiment is connected to the electroabsorption optical modulator 2, a pulse modulation signal $c_1$ having a sharp peak waveform shown in FIG. 2D is applied to the electroabsorption optical modulator 2.

Hence, the optical pulses $d_3$ output from the electroabsorption optical modulator 2 have a period Ta and small pulse width Ts.

Specific features of the dispersion decreasing fiber (DDF) 17 will be explained below.

The pulse width of optical pulses which are propagated at high speed in the fiber is broadened due to wavelength dispersion in the propagation process.

The wavelength dispersion (group delay) depends on a wavelength λ of light that travels, as shown in FIG. 9A.

A wavelength $\lambda_0$ at which a minimum wavelength dispersion (group delay) is obtained is defined to be zero dispersion wavelength.

The wavelength $\lambda_0$ at which the minimum wavelength dispersion (group delay) is obtained, i.e., zero dispersion wavelength, is determined by material dispersion and waveguide dispersion.

Hence, by changing the waveguide dispersion of the optical fiber, zero dispersion wavelength can be changed in the longitudinal direction of the fiber, as shown in FIG. 9B.

The dispersion decreasing fiber (DDF) 17 used in the device of this embodiment uses a fiber in which the wavelength dispersion becomes zero dispersion at a fiber length La in the longitudinal direction and dispersion gradually decreases from the input end toward the output end with respect to light having a wavelength of 1.55 μm that can minimize the loss of a silica-based fiber.

On the other hand, as shown in FIG. 10, when a fiber length Ls satisfies a soliton condition including a wavelength condition of zero dispersion wavelength, the Kerr effect that shortens the pulse width of the output pulse waveform from this fiber is produced when the input pulse waveform to this fiber has large power.

Note that the Kerr effect that shortens the pulse width of the output pulse waveform requires the power of the input pulse waveform, to be equal to or higher than a prescribed value.

Hence, in the device of the fourth embodiment, after the optical pulses $d_3$ output from the electroabsorption optical modulator 2 are optically amplified to a prescribed level by the optical fiber amplifier (EDFA) 16, the amplified optical pulses pass through the dispersion decreasing fiber (DDF) 17 that satisfies the above condition, thus further shortening the pulse width Ts of the final optical pulses $d_6$ output from the dispersion decreasing fiber (DDF) 17.

Furthermore, as shown in FIG. 10, the relationship among a soliton length that satisfies the soliton condition of the fiber, a dispersion value $\beta_2$ that characterizes the input pulse waveform to the fiber which satisfies the soliton condition, and a pulse width $T_0$ is given by:

$$Ls = K \cdot T_0^2 / |\beta_2| \quad (1)$$

where K is a constant.

As can be seen from equation (1), in order to shorten the soliton length Ls as the fiber length of the dispersion decreasing fiber (DDF) 17, it is more effective to shorten the pulse width $T_0$ that influences the soliton length by its square.

In the device of the fourth embodiment, since the pulse width Ts of the optical pulses $d_3$ output from the electroabsorption optical modulator 2 has been shortened in comparison with a conventional manner, the soliton length Ls makes to be shortened.

Hence, the fiber length of the dispersion decreasing fiber (DDF) 17 that extends over ten-odd km required in the conventional manner can be greatly shortened to 4 km order, for example.

Fifth Embodiment

Figure 11:
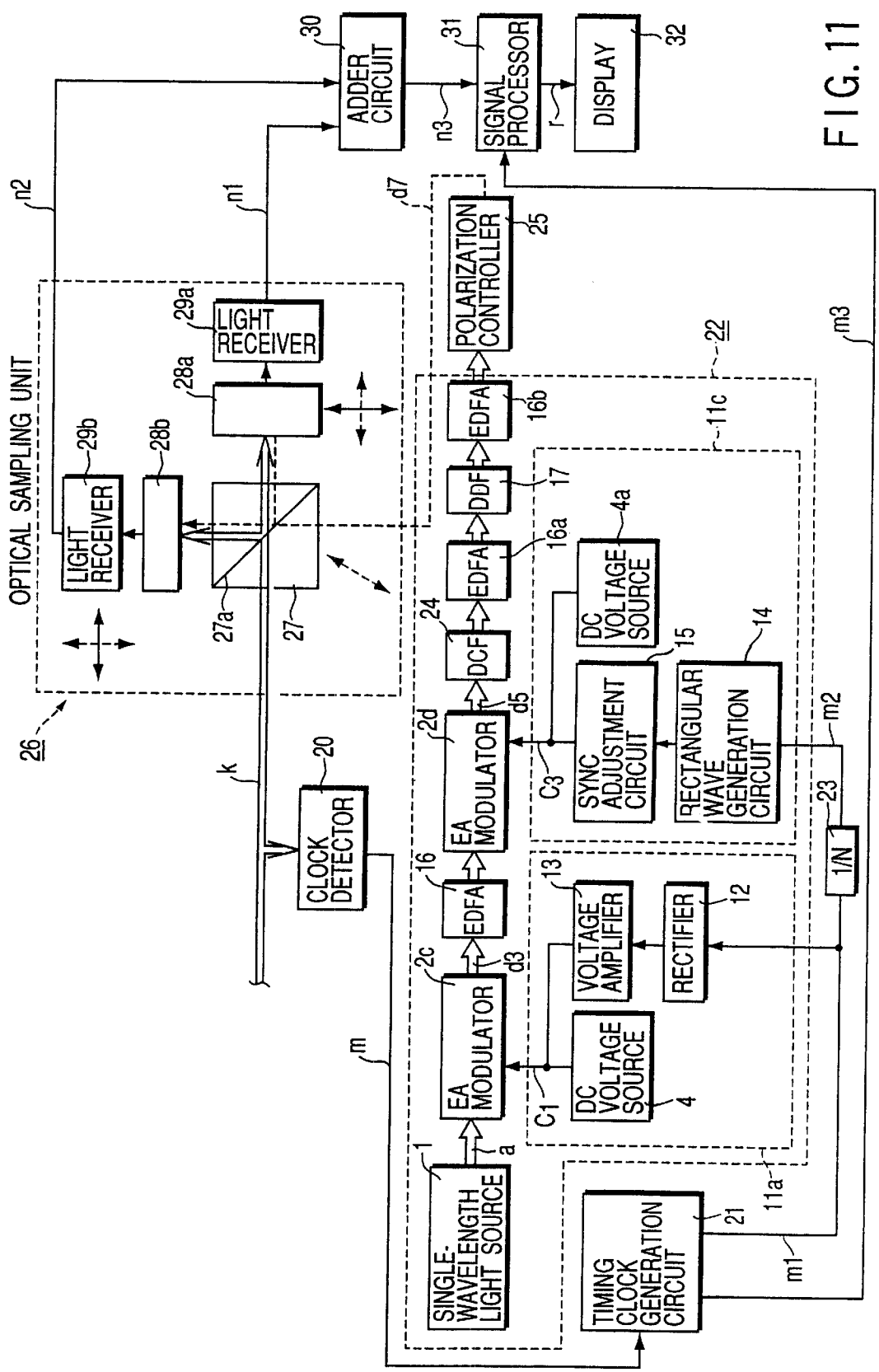
FIG. 11 is a schematic block diagram showing the arrangement of a light sampling waveform measurement apparatus of the fifth embodiment in which an optical pulse generation device according to the present invention is assembled.

FIG. 11 is a schematic block diagram showing the arrangement of a light sampling waveform measurement apparatus of the fifth embodiment, in which the optical pulse generation device according to one of the above embodiments of the present invention is assembled.

The same reference numeral in FIG. 11 denote the same parts as those in the optical pulse generation device of the third embodiment shown in FIG. 6, and a detailed description thereof will be omitted.

More specifically, as shown in FIG. 11, externally input light k to be measured, which has a repetition period Tb, as shown in, e.g., FIG. 12A, is input to a clock detector 20 to detect its repetition period Tb, and a clock signal m having the detected repetition period Tb is input to a timing clock generation circuit 21.

The timing clock generation circuit 21 inputs a sampling clock signal $m_1$, which is sequentially delayed a predetermined time ΔT from the clock signal m having the period Tb (frequency f), to a half-wave rectifier 12 in a first modulation signal generation circuit 11a in an optical pulse generation device 22.

Hence, the first modulation signal generation circuit 11a applies a first pulse modulation signal $c_1$ having a sharp peak waveform to a first electroabsorption optical modulator 2c in synchronism with the sampling clock signal $m_1$.

The sampling clock signal $m_1$, which is output from the timing clock generation circuit 21 and is sequentially delayed the predetermined time ΔT at every period Tb, is frequency-divided to 1/N by a frequency divider 23 to obtain a new sampling clock signal $m_2$. The sampling clock signal $m_2$ is input to a sync adjustment circuit 15 in a second modulation signal generation circuit 11c in the optical pulse generation device 22.

Hence, the second modulation signal generation circuit 11c applies a second pulse modulation signal $C_3$ having a rectangular waveform to a second electroabsorption optical modulator 2d in synchronism with the sampling clock signal $m_2$.

Then, light a output from a single-wavelength light source 1 is modulated by the first electroabsorption optical modulator 2c to obtain optical pulses $d_3$, and the optical pulses $d_3$ are optically amplified by an optical fiber amplifier (EDFA) 16 and then further modulated by the second electroabsorption optical modulator 2d to obtain optical pulses $d_5$.

Hence, the optical pulses $d_5$ are obtained by decimating the optical pulses $d_3$ output from the first electroabsorption optical modulator 2c to 1/N.

More specifically, the optical pulses $d_5$ are sequentially delayed the predetermined time $\Delta T$ every time a period (Tb×N) (frequency f/N) elapses.

The optical pulses $d_5$ output from the second electroabsorption optical modulator 2d are input to a dispersion compensated fiber (DCF) 24 to suppress chirping, and are optically amplified by an optical fiber amplifier (EDFA) 16a again.

After that, the pulse width of the optical pulses is further shortened by a dispersion decreasing fiber (DDF) 17, and these optical pulses are optically amplified by an optical fiber amplifier (EDFA) 16b. The optical pulses are output from the optical pulse generation device 22 and are input to a polarization controller 25.

The polarization controller 25 controls the polarization direction of the input optical pulses in a 45° direction with respect to the reference direction, as shown in FIG. 11.

Sampling optical pulses $d_7$ in the 45° direction output from the polarization controller 25 is launched into one surface of a polarization splitter 27 comprising, e.g., a polarization beam splitter (PBS) or the like in a light sampling unit 26.

More specifically, the sampling optical pulses $d_7$ become optical pulses which are sequentially delayed the predetermined time $\Delta T$ every time the period (Tb×N) (frequency f/N) elapses, as shown in FIG. 12B.

Note that the light k to be measured is incident on a surface of the polarization splitter 27, that neighbors its one surface.

A half mirror 27a whose surface has a polarization coat is assembled in the polarization splitter 27.

The half mirror 27a passes a polarization component in a 90° direction with reference to the reference direction (0° direction) of incoming light.

Hence, a polarization component in the reference direction of the sampling optical pulses $d_7$ having a plane of polarization in the 45° direction, and that in the 90° direction of the light k to be measured enter a type-2 nonlinear optical material 28a.

On the other hand, a polarization component in the 90° direction of the sampling optical pulses $d_7$ and that in the reference direction of the light k to be measured enter another type-2 nonlinear optical material 28b.

Figure 13:
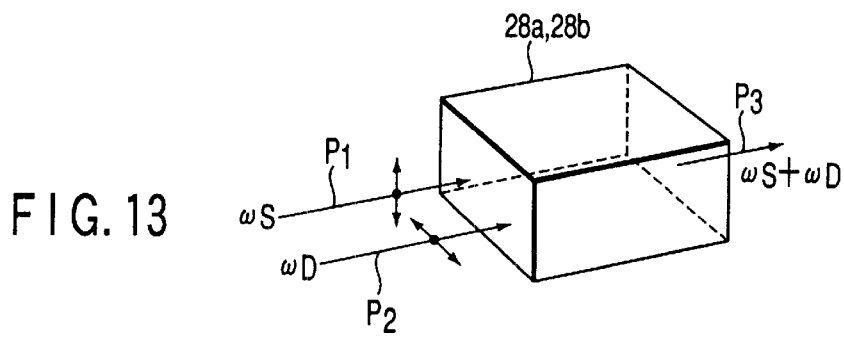
FIG. 13 is a perspective view for explaining the optical characteristics of a nonlinear optical material used in the light sampling waveform measurement apparatus shown in FIG. 11.

The type-2 nonlinear optical materials 28a and 28b have known physical properties. That is, upon receiving a pair of light components $P_1$ and $P_2$, the polarization directions of which are set in 90° different directions and which respectively have angular frequencies $\omega_S$ and $\omega_D$ on one surface, sum frequency light $p_3$ having a sum angular frequency $(\omega_S+\omega_D)$ is output from the other surface, as shown in FIG. 13.

Therefore, since the sampling optical pulses $d_7$ and light k to be measured, the planes of polarization of which are set in 90° different directions, are input to the nonlinear optical material 28a, phasing is attained, and the type-2 nonlinear optical material 28a outputs sum frequency light having a sum angular frequency to a next light receiver 29a.

Likewise, since the sampling optical pulses $d_7$ and light k to be measured, the planes of polarization of which are set in 90° different directions, are input to the nonlinear optical material 28b, phasing is attained, and the type-2 nonlinear optical material 28b outputs sum frequency light having a sum angular frequency to a next light receiver 29b.

Hence, calculating added sum frequency light q obtained by adding the sum frequency light components output from the nonlinear optical materials 28a and 28b, a waveform obtained by sampling the waveform of the light k to be measured using the sampling optical pulses $d_7$, understands to obtain all the time without depending the polarization state of the light k to be measured, as shown in FIG. 12C.

The light receivers 29a and 29b respectively convert the incoming sum frequency light components into electrical signals $n_1$ and $n_2$, and send them to an adder circuit 30 in the actual system.

The adder circuit 30 adds the electrical signals $n_1$ and $n_2$, and outputs the sum signal to a next signal processor 31 as an optical pulse train signal $n_3$.

Hence, this optical pulse train signal $n_3$ has a signal waveform in which the signal levels of the individual pulses correspond to the light intensity values of the individual pulses of the added sum frequency light q, as shown in FIG. 12D.

The signal processor 31 obtains an envelope r that represents a signal waveform obtained by expanding the light k to be measured along the time axis on the basis of the optical pulse train signal $n_3$ input from the adder circuit 30 by using a predetermined timing clock signal $m_3$ output from the timing clock generation circuit 21, and displays on a display 32 the signal waveform of the light k to be measured, which is represented by the envelope r and is expanded along the time axis.

In the light sampling waveform measurement apparatus with the above arrangement, the pulse width TS of each pulse in the sampling optical pulses $d_7$ which are input from the optical pulse generation device 22 to the light sampling unit 26 can be greatly reduced.

Therefore, since the light signal waveform of the light k to be measured can be sampled using the sampling optical pulses $d_7$ having a short pulse width Ts, the light signal waveform of the light k to be measured can be sampled at shorter time intervals, thus greatly improving the waveform measurement precision of the light k to be measured.

As described above, in the optical pulse generation method and device of the present invention, since a sharp peak waveform is formed in a pulse modulation signal to be applied to the electroabsorption optical modulator by a simple circuit arrangement, only the pulse width can be further shortened compared to the repetition period of output optical pulses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical pulse generation method in which a pulse modulation signal is applied to an electroabsorption optical modulator while continuous, single-wavelength light is launched into the electroabsorption optical modulator so as to modulate the incoming single-wavelength light by the pulse modulation signal and to output the modulated light as optical pulses, comprising the steps of:

generating an electrical signal having a sine waveform;

extracting only a waveform not less than a predetermined DC voltage from the sine waveform of the electrical signal; and adding a negative DC voltage to the extracted waveform, and applying the sum signal to the electroabsorption optical modulator as the pulse modulation signal.

2. An optical pulse generation device comprising:

a single-wavelength light source for outputting continuous, single-wavelength light;

an electroabsorption optical modulator for receiving the single-wavelength light output from said single-wavelength light source, modulating the incoming single-wavelength light according to an externally applied pulse modulation signal, and outputting the modulated light as optical pulses;

a sine-wave voltage generator for generating an electrical signal having a sine waveform;

a nonlinear circuit for extracting only a waveform not less than a predetermined DC voltage from the sine waveform of the electrical signal generated by said sine-wave voltage generator; and a DC voltage source for adding a negative DC voltage to the extracted waveform by said nonlinear circuit, and applying the sum signal to said electroabsorption optical modulator as the pulse modulation signal.

3. A device according to claim 2, wherein said nonlinear circuit comprises:

a half-wave rectification circuit for outputting a half-wave rectified signal of the electrical signal having the sine waveform, which is output from said sine-wave voltage generator; and a voltage amplifier for voltage-amplifying the half-wave rectified signal output from said half-wave rectification circuit.

4. A device according to claim 2, wherein said nonlinear circuit comprises a voltage amplifier, an operation point of which can be shifted, and voltage-amplifies the electrical signal having the sine waveform output from said sine-wave voltage generator while the operation point is shifted in a negative direction.

5. An optical pulse generation device comprising:

a single-wavelength light source for outputting continuous, single-wavelength light;

a first electroabsorption optical modulator for receiving the single-wavelength light output from said single-wavelength light source, modulating the incoming single-wavelength light according to an externally applied pulse modulation signal, and outputting the modulated light as optical pulses;

a first modulation signal generation circuit comprising
 a) a sine-wave voltage generator for generating an electrical signal having a sine waveform,
 b) a nonlinear circuit for extracting only a waveform not less than a predetermined DC voltage from the sine waveform of the electrical signal generated by said sine-wave voltage generator, and
 c) a DC voltage source for adding a negative DC voltage to the extracted waveform by said nonlinear circuit, and applying the sum signal to said first electroabsorption optical modulator as the pulse modulation signal;

a second electroabsorption optical modulator for receiving the optical pulses output from said first electroabsorption optical modulator, modulating the incoming optical pulses according to an externally applied pulse modulation signal, and outputting the modulated optical pulses as final optical pulses; and a second modulation signal generation circuit comprising
 a) a DC voltage source for outputting a negative DC voltage,
 b) a rectangular wave signal generation circuit for outputting a rectangular wave signal, and
 c) a sync adjustment circuit, said second modulation signal generation circuit synchronously adjusting the rectangular wave signal output from said rectangular wave signal generation circuit by said sync adjustment circuit to make individual rectangular waves of the rectangular wave signals include optical pulses once every predetermined number of pulses, adding the negative DC voltage output from said DC voltage source to the adjusted rectangular wave signal, and applying the sum signal to said second electroabsorption optical modulator as the pulse modulation signal.

6. An optical pulse generation device comprising:

a single-wavelength light source for outputting continuous, single-wavelength light;

an electroabsorption optical modulator for receiving the single-wavelength light output from said single-wavelength light source, modulating the incoming single-wavelength light according to an externally applied pulse modulation signal, and outputting the modulated light as optical pulses;

a modulation signal generation circuit comprising
 a) a sine-wave voltage generator for generating an electrical signal having a sine waveform,
 b) a nonlinear circuit for extracting only a waveform not less than a predetermined DC voltage from the sine waveform of the electrical signal generated by said sine-wave voltage generator, and
 c) a DC voltage source for adding a negative DC voltage to the extracted waveform by said nonlinear circuit, and applying the sum signal to said electroabsorption optical modulator as the pulse modulation signal; and a dispersion decreasing fiber for receiving the optical pulses output from said electroabsorption optical modulator at one end, and outputting the incoming optical pulses as final optical pulses from the other end.

7. An optical sampling pulse generation device for outputting optical sampling pulses used to sample light to be measured, which enters a light sampling unit in a light sampling waveform measurement apparatus, comprising:

a single-wavelength light source for outputting continuous, single-wavelength light;

a first electroabsorption optical modulator for receiving the single-wavelength light output from said single-wavelength light source, modulating the incoming single-wavelength light according to an externally applied pulse modulation signal, and outputting the modulated light as optical pulses;

a first modulation signal generation circuit comprising
 a) a nonlinear circuit for extracting only a waveform not less than a predetermined DC voltage from an electrical signal having a sine waveform, and b) a DC voltage source for adding a negative DC voltage to the extracted waveform by said nonlinear circuit, and applying the sum signal to said first electroabsorption optical modulator as the pulse modulation signal;

a second electroabsorption optical modulator for receiving the optical pulses output from said first electroabsorption optical modulator, modulating the incoming optical pulses according to an externally applied pulse modulation signal, and outputting the modulated optical pulses as final optical pulses; and a second modulation signal generation circuit comprising
a) a DC voltage source for outputting a negative DC voltage,
b) a rectangular wave signal generation circuit for outputting a rectangular wave signal, and
c) a sync adjustment circuit, said second modulation signal generation circuit synchronously adjusting the rectangular wave signal output from said rectangular wave signal generation circuit by said sync adjustment circuit to make individual rectangular waves of the rectangular wave signals include optical pulses once every predetermined number of pulses, adding the negative DC voltage output from said DC voltage source to the adjusted rectangular wave signal, and applying the sum signal to said second electroabsorption optical modulator as the pulse modulation signal;

a dispersion decreasing fiber for receiving the optical pulses output from said second electroabsorption optical modulator at one end, and outputting the incoming optical pulses as final optical pulses from the other end;

a timing clock generation circuit for supplying a first sampling clock signal which is delayed a predetermined time from a clock signal based on a repetition period of the light to be measured to said nonlinear circuit of said first modulation signal generation circuit as the electrical signal having the sine waveform; and a frequency divider for supplying a second sampling clock signal which is obtained by frequency-dividing the first sampling clock signal from said timing clock generation circuit at a predetermined ratio to said sync adjustment circuit of said second modulation signal generation circuit.

* * * * *